United States Patent

[11] 3,618,902

[72] Inventor Ambrose K. Brennan, Jr.
  Thomasville, Pa.
[21] Appl. No. 876,681
[22] Filed Nov. 14, 1969
[45] Patented Nov. 9, 1971
[73] Assignee Teledyne Inc.
  York, Pa.

[54] CONTINUOUS MIXER
  3 Claims, 13 Drawing Figs.
[52] U.S. Cl. .................................................. 259/6,
  259/104
[51] Int. Cl. ..................................................... B01f 7/04
[50] Field of Search ......................................... 259/6, 104

[56]  References Cited
  UNITED STATES PATENTS
3,490,750  1/1970  Brennan, Jr. .................  259/104
2,883,162  4/1959  Rapson ..........................  259/6 X
3,195,868  7/1965  Loomans et al. .............  259/104
3,446,485  5/1969  Fischer .........................  259/6

Primary Examiner—Walter A. Scheel
Assistant Examiner—Alan I. Cantor
Attorney—Otto Moeller ABSTRACT: A continuous mixer for intimately mixing, kneading, blending and/or reacting a wide variety of materials, the mixer including a horizontal mixing barrel which in cross section is in the form of intersecting major arcs providing a pair of side-by-side communicating cylindrical chambers with a material inlet adjacent one end and a material outlet at the opposite end. An axially extending shaft is disposed in each chamber having secured thereon a plurality of contiguous progressively offset generally lenticular-shaped interengaging paddles rotating in the same direction forming pockets varying in volume. The construction and arrangement of the paddles are such as to provide a minimal clearance between the rotor crests and their enveloping chamber walls and a clearance of about two to five times such minimal clearance between the crests of a paddle and the flanks of its mating paddle whereby most of the material is extruded from a compression pocket to an expansion pocket through the clearance between crests of a paddle and the flanks of its mating paddle which are moving in mutually opposite directions resulting in high shear with consequent highly efficient mixing.

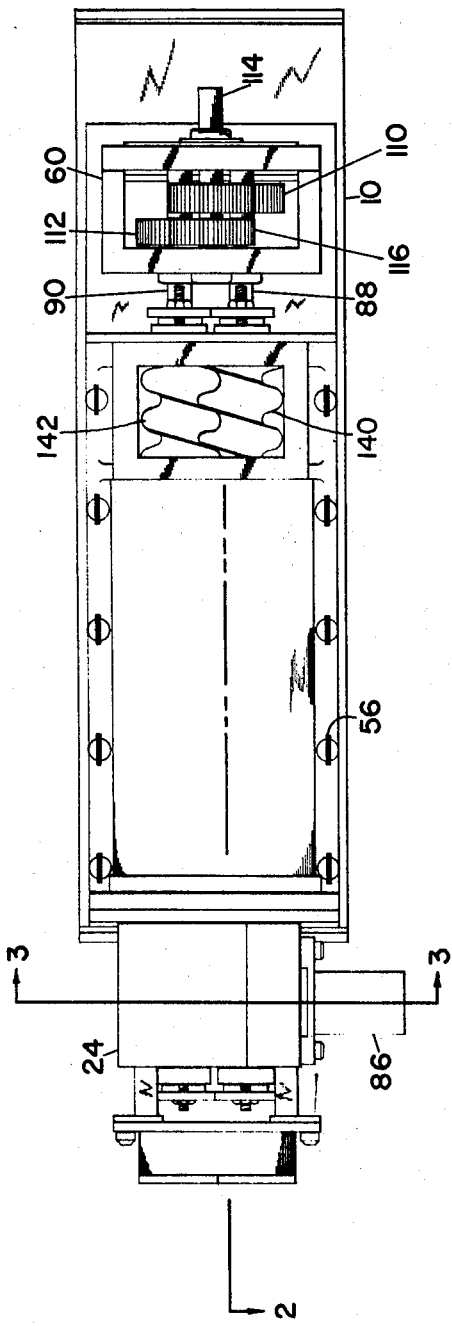
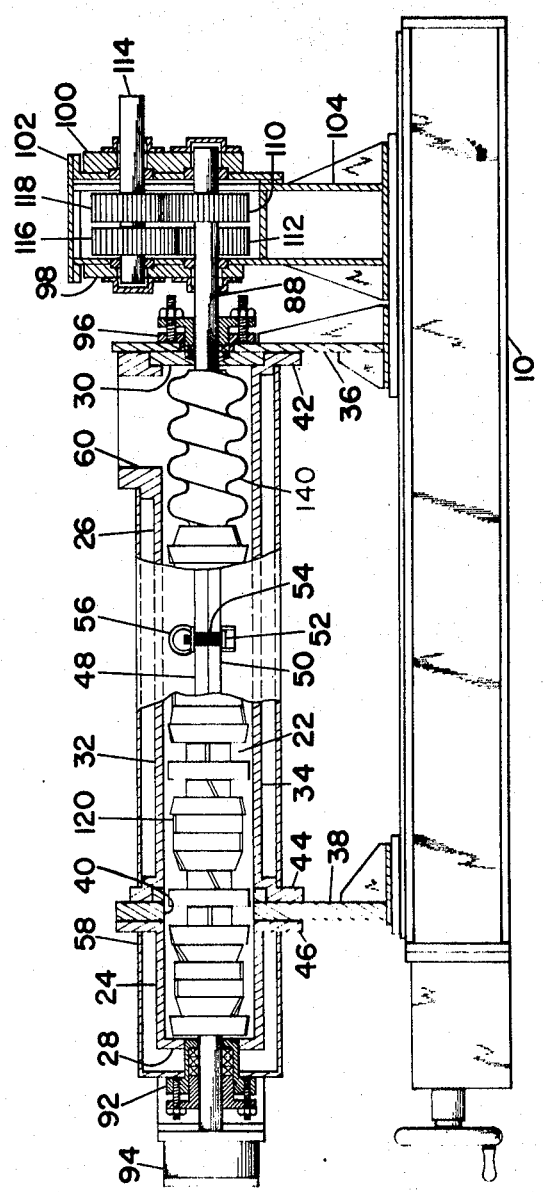
Fig 1
Fig 2
INVENTOR
AMBROSE K. BRENNAN, JR.
BY
Otto Moeller

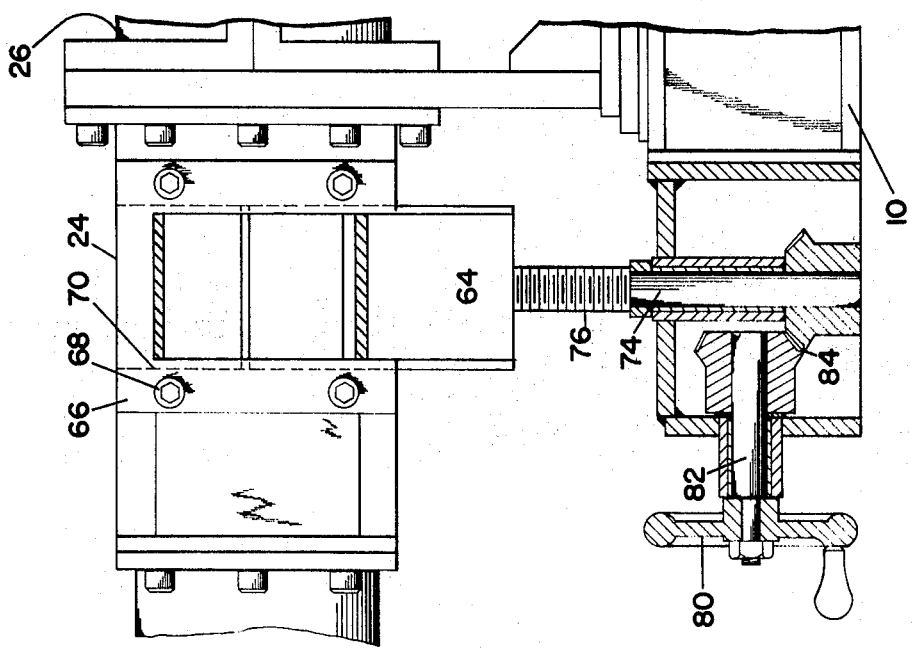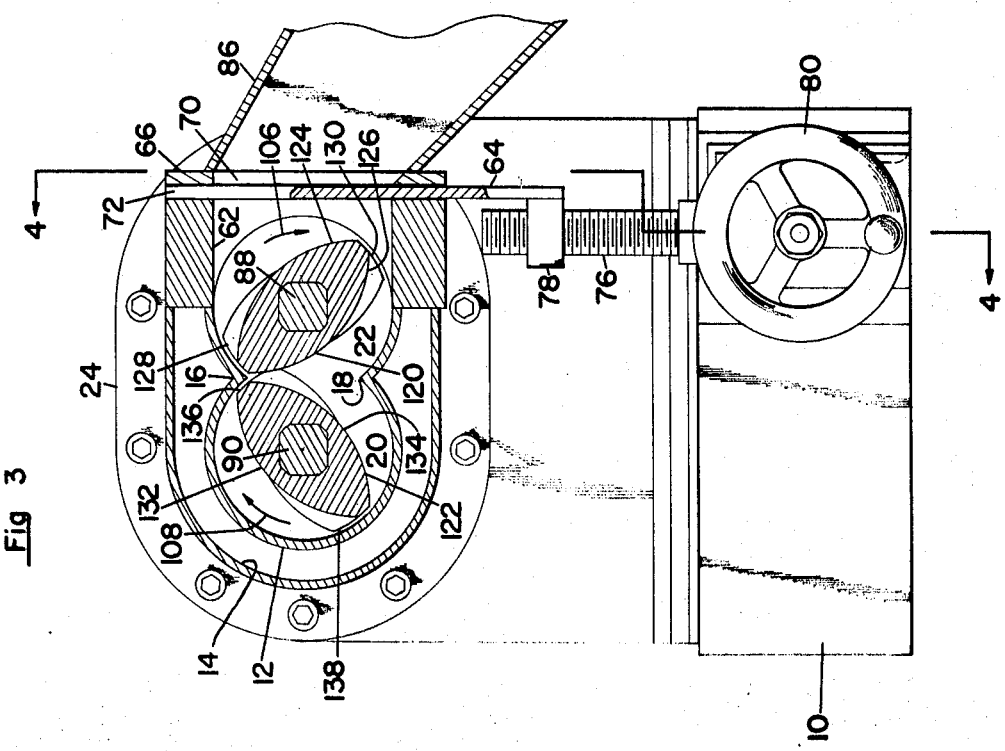

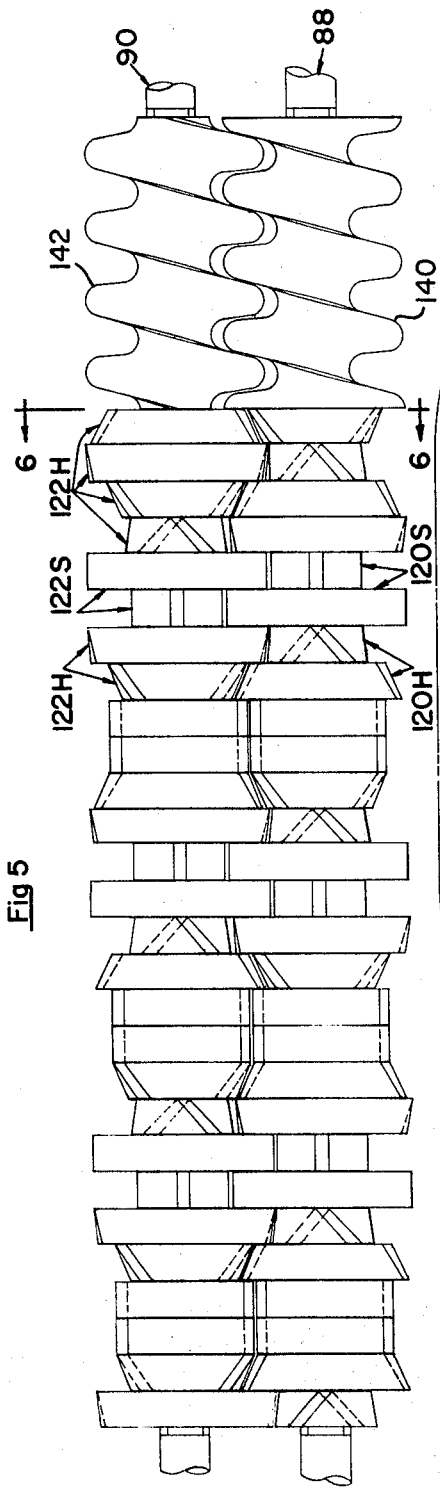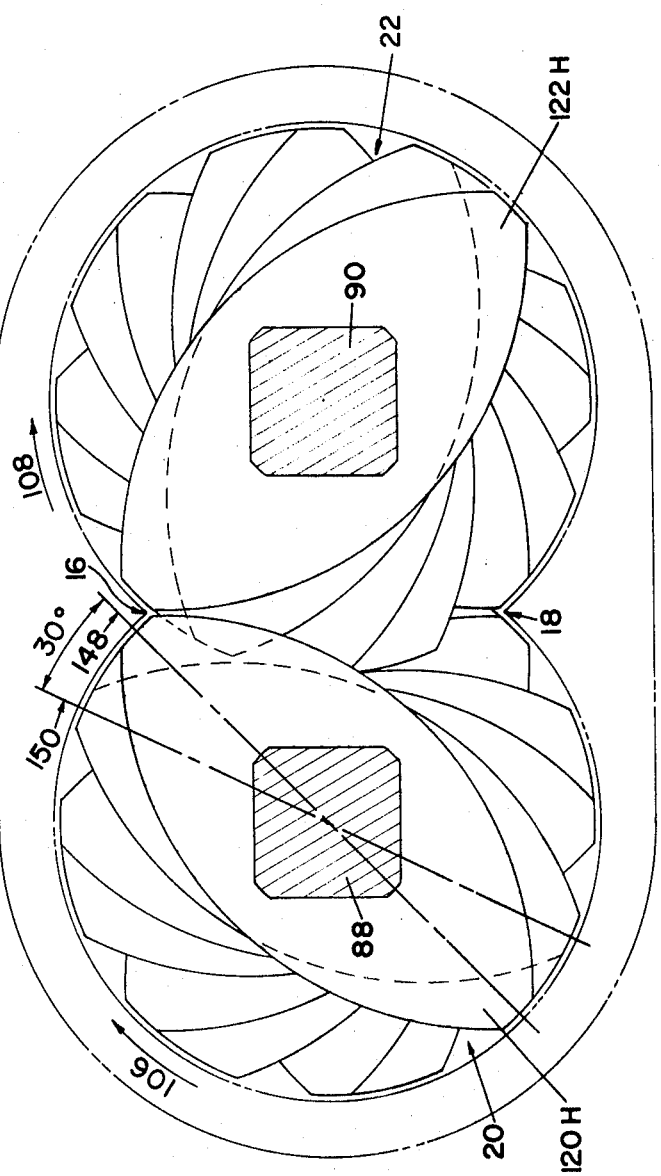

PATENTED NOV 9 1971
3,618,902
SHEET 4 OF 4
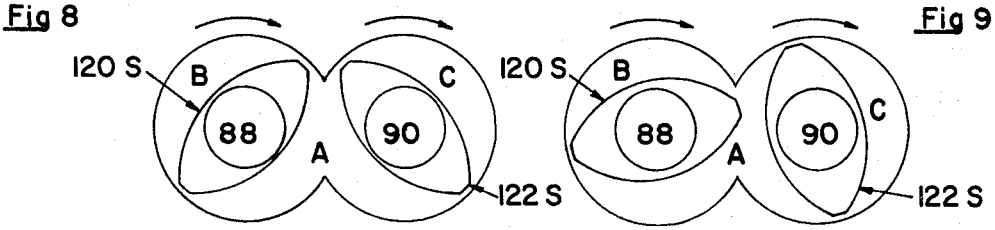
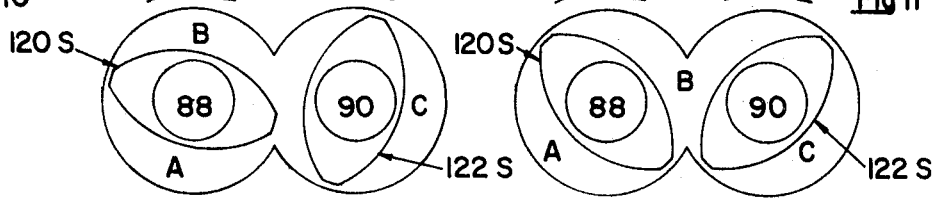
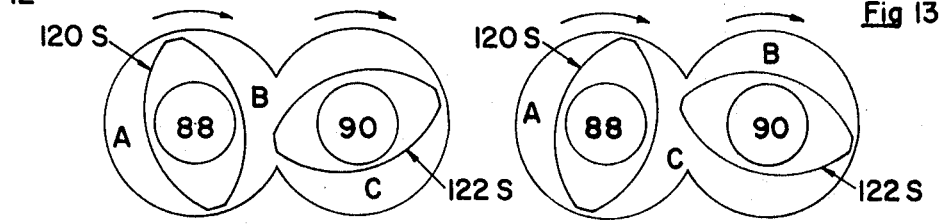
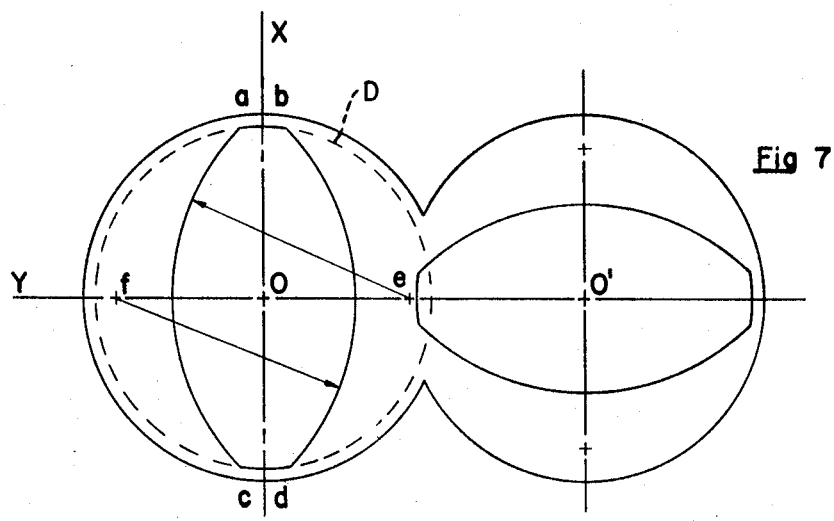
INVENTOR.
AMBROSE K. BRENNAN, JR.
BY
*Otto Moeller*

3,618,902

CONTINUOUS MIXER

BACKGROUND AND SUMMARY OF THE INVENTION

The present invention relates to apparatus for continuously homogeneously mixing, kneading, bending and/or reacting a wide variety of materials in fluid, plastic, granular or powdered form.

In such apparatus, it has heretofore been proposed to employ a mixing barrel which in cross section is in the form of intersecting major arcs, providing a pair of communicating cylindrical chambers in each of which is disposed an axially extending rotatable shaft having secured thereon a plurality of contiguous progressively offset generally lenticular paddles. The paddles are rotated in the same direction and are formed and arranged so that the crests of the paddles wipe the walls defining their associated chambers and so that the crests of the paddles in each chamber wipe the flanks of their mating paddles in the other chamber. The rotation of two interengaging paddles form with the chamber walls pockets that vary in volume to provide compression and expansion pockets.

With only such running clearances as above, theoretically the material will not pass therethrough. In such an arrangement, the material for the most part is mixed by being subjected to compression and expansion which results, of course, in action similar to kneading. But during compression and expansion strokes, the material must be moved somewhere since it is usually an incompressible material and therefore it moves or is extruded primarily either forward or backward depending upon the location of the adjacent pair of paddles and the presence or absence of a helical angle on the paddles in question.

Better shear conditions are obtained if the material is also allowed to extrude from a compression pocket into an expansion pocket through a significant clearance between the crest of a paddle and the flank of a mating paddle. This is a most important clearance since the material will extrude therethrough during the compression part of the cycle and very high shear rates will result since the crest of the paddle and the flank of the mating paddle are actually moving in opposite directions to each other during this portion of the cycle, and the high shear rates result in more efficient mixing.

More specifically, the paddles are constructed and arranged in the mixer barrel to provide a clearance between the crests of the paddles and the barrel chamber walls equal to about 1 percent of the major diameter of the paddles and depending on the viscosity of the material being mixed, the centers of the paddles are spaced apart to provide a clearance between the crests of the paddles and the flanks of the mating paddles of approximately two to five times the clearance between the crests of the paddles and the barrel chamber walls.

It is therefore an object of the invention to provide an improved and more efficient mixing and kneading apparatus.

More specifically, an object is to provide an improved mixer wherein the novel relation of the mixer paddles with each other and with their enclosing chamber walls cooperate to produce a more effective shearing, mixing and kneading action on the material.

A further object is to provide in such mixers paddles that are simple to lay out and that are simple and cheap to manufacture.

Other objects and advantages of the invention will be hereinafter pointed out or will become apparent from the following description when read in conjunction with the accompanying drawings.

BRIEF DESCRIPTION OF THE DRAWINGS

FIG. 1 is a top plan view of the continuous mixer with the cover of the gearbox removed;

FIG. 2 is a longitudinal vertical sectional view taken on irregular lines 2—2 of FIG. 1, with parts being shown in side elevation;

FIG. 3 is a sectional view taken on line 3—3 of FIG. 1;

FIG. 4 is a sectional view taken on irregular line 4—4 of FIG. 3;

FIG. 5 is an enlarged plan view of a preferred arrangement and construction of paddles and conveying elements of the mixer;

FIG. 6 is a sectional view taken on line 6—6 of FIG. 5 with the mixer barrel shown in phantom;

FIG. 7 is a diagrammatic view showing the profiles of a pair of cooperating interengaging paddles illustrating the manner in which the profiles are arrived at; and FIGS. 8-13 diagrammatically show a pair of cooperating interengaging paddles in progressive positions of rotation, revealing the change in size of the pockets formed between the paddles and their enclosing chamber walls.

Referring to the drawings showing a preferred embodiment of the invention, a generally rectangular base designated by reference numeral 10 is provided for supporting the continuous mixer.

The mixer includes a horizontal longitudinally elongated barrel or casing 12 housing the means for continuously mixing the materials in their passage therethrough. In cross section through the barrel 12, as best shown in FIG. 3, its inner wall 14 is in the form of side by side circular major arcs of equal radii intersecting at 16 and 18 to provide side-by-side intersecting cylindrical chambers 20 and 22 communicating with each other through the opening between intersections 16 and 18. The barrel 12 includes a discharge end portion 24 and a main body portion 26, having a rear end wall 28 at the discharge end of the barrel 12 and a front end wall 30 at the feed end of the barrel 12.

The main body portion 26 of the barrel 12 is horizontally split to form mating upper and lower barrel sections 32 and 34, the upper barrel section 32 being removable to provide for convenient access to the interior of the barrel. The main body portion 26 of the barrel 12 is supported in spaced relation above the base 10 by and extends between transversely extending upstanding front and rear support plates 36 and 38, and the discharge end portion 24 of the barrel 12 is supported by the rear support plate 38. The rear support plate 38 is provided with an opening 40 that conforms with the adjacent open ends of the main body portion and the discharge end portion of the barrel 12 to provide uninterrupted communication therebetween. The lower ends of the support plates 36 and 38 are rigidly secured in any suitable manner to the base 10.

The forward and rearward ends of the lower barrel section 34 of main body portion 26 of the barrel 12 are provided with peripheral radially outwardly projecting flanges 42 and 44 in confronting facial engagement with the support plates 36 and 38 and to which they are secured by cap screws or other suitable means, not shown, to provide rigid supporting means for the lower barrel section 34. The forward end of the discharge end portion 24 of the barrel 12 is provided with a peripheral radially outwardly projecting flange 46 in confronting facial engagement with the rear support plate 38 and to which it is rigidly secured by capscrews or other suitable means, not shown. The upper barrel section 32 is supported on the lower barrel section 34 and is releasably secured thereto to cross-sectional removal for gaining access to the inside of the barrel 12. As shown, the abutting mating edges of the upper and lower barrel sections 32 and 34 are provided with confronting laterally outwardly projecting longitudinally extending flanges 48 and 50. A plurality of swing bolts 52 carried by the lower barrel section 34 are arranged to engage matching slots 54 in the flanges 48 and 50, and wingnuts 56 threaded on the projecting free ends of the bolts 52, when drawn up tight, securely clamp the barrel sections 32 and 34 together. The barrel 12 is preferably surrounded by a jacket 58 through which a heat exchange medium may be circulated.

The top wall of the barrel main body portion is provided adjacent its end wall 30 with an inlet 60 through which the material to be treated or mixed is introduced, and the laterally outer sidewall of the barrel discharge end portion is provided with a discharge duct 62 that has a rectangular configuration in cross section. The extent of the open end of the discharge duct 62 is controlled by a vertically slidable slide plate 64, as best shown in FIGS. 3 and 4. A generally rectangular slide-receiving plate 66 is secured by suitable means, as by the capscrews 68 to the outer end face of the discharge duct 62, the slide receiving plate being provided with an opening 70 registering with the open end of the discharge duct 62. The inner face of the slide receiving plate 66 is provided with a vertically extending shallow recess 72 forming with the outer end face of the discharge duct 62 a slideway in which the slide plate 64 is adapted to be slidably raised or lowered to control the extent of the open end of the discharge duct 62 and the opening 70 in the slide receiving plate 66.

As shown in FIGS. 3 and 4, the means for adjusting the slide plate 64 includes a vertically extending shaft 74 having a threaded upper end portion 76 threaded through a boss 78 rigidly secured to the lower end of the slide plate 64, so that by turning the handwheel 80 secured on the outer end of a transversely extending adjusting shaft 82, the inner end of which is operatively connected to the lower end of shaft 74 through bevel gearing 84, the slide plate 64 may be raised or lowered to control the extent of the discharge opening of the discharge duct 62 and the registering opening 70 in the slide-receiving plate 66. A discharge spout 86 is secured in suitable manner to the slide-receiving plate 66 and is arranged to embrace the opening 70 in the plate 66.

Extending through the barrel 12 and projecting beyond the end walls 28 and 30 thereof, are a pair of shafts 88 and 90 disposed, respectively, coaxially of the cylindrical chambers 20 and 22. The ends of shafts 88 and 90, projecting from end wall 28, extend through suitable stuffing boxes 92 carried by said end wall, and are journaled in suitable bearings, not shown, in bearing housing 94. The ends of shafts 88 and 90 projecting from end wall 30 extend through suitable stuffing boxes 96 carried by said end wall, and are journaled in suitable bearings carried by the opposite end walls 98 and 100 of a gear housing 102 which is supported on base 10 by standard 104.

The shafts 88 and 90 are arranged to be rotated in the same direction as indicated by the directional arrows 106 and 108 in FIGS. 3 and 6. The drive for the shafts 88 and 90 includes axially offset gears 110 and 112 disposed in the gear housing 102 and fixed respectively on shafts 88 and 90. A drive shaft 114, disposed above the shafts 88 and 90 centrally between the vertical planes passing through the axes of the shafts 88 and 90, extends into and is journaled in suitable bearings carried by the housing 102. Fixed on the drive shaft 114 are axially spaced gears 116 and 118, the gear 116 meshing with gear 112, and gear 118 meshing with gear 110. Suitable motive means, not shown, is provided for rotating the drive shaft 114.

Fixed on shaft 88 for rotation therewith but axially slidable therealong to facilitate assembly and disassembly are a plurality of contiguous paddles 120, identical in cross sectional configuration. The paddles 120 are arranged for substantial interengagement with laterally adjacent similar paddles 122 on shaft 90. In a preferred embodiment, as best shown in FIG. 5, certain of the mating paddles 120 and 122 are twisted on a helix and are identified by the suffix H, the direction of twist of these paddles and their direction of rotation being such as to impart a forward conveying movement to the material in addition to effecting mixing of the material. Other mating paddles 120 and 122 are nonhelical or straight and are identified by the suffix S, these paddles having primarily a mixing action.

All of the paddles 120 and 122 in any cross section normal to the axes of the shafts 88 and 90 are lenticular in shape, the paddles 120 having convex flanks 124 and 126, the radially outer ends of which are joined by arcuate crests 128 and 130, and the paddles 122 having convex flanks 132 and 134 and arcuate crests 136 and 138.

The cross-sectional configuration of the paddles 120 and 122 and relation one to the other is such that when rotated at the same speed and in the same direction they will interengage, with each of the crests of one paddle following a respective flank of its mating paddle and having therebetween a clearance hereinafter described for a purpose also hereinafter described. Additionally, the relation of the paddles 120 and 122 with respect to the arcuate walls of the barrel 12 defining the chambers 20 and 22 is such as to provide between the paddle crests 128, 130, 136 and 138 and the walls of the chambers a clearance hereinafter described for a purpose also hereinafter described.

Referring to FIG. 7, the cross-sectional configuration and relation of the paddles is arrived in the following manner. Let the broken line circle D represent the peripheral envelope of one of the paddles, the diameter of which is selected to equal the desired major axis of the paddle. On the circle D lay out the diametrically opposite desired equal crests $ab$ and $cd$ of the paddle, bisected by the ordinate X, such crests being less than half the major axis of the paddle. From a point $e$ on the abscissa Y, offset from the center O of circle D a distance equal to one-half the major diameter of the paddle less the width of the crest $ab$ (or $cd$), describe an arc connecting points $a$ and $c$, the said arc $ac$ defining one flank of the paddle. From a point $f$ on abscissa Y, offset from the center O of circle D a distance equal to O$e$ describe an arc connecting points $b$ and $d$, the said arc $bd$ defining the opposite flank of the paddle.

The mating paddle is layed out in similar manner but is disposed with its major diameter at right angles with respect to the major diameter of the other paddle, with centers O, O' spaced apart on abscissa Y a distance equal to one-half the sum of the major and minor diameters of a paddle plus the hereinafter defined clearance between the crest of one paddle and the flank of its mating paddle. The walls of the chambers 20 and 22 housing the paddles are defined by intersecting arcs described from points O and Q', the radii of which are equal to one-half the major diameters of the paddles plus the hereinafter defined clearance between the paddle crests and the walls of the chambers.

The clearance between the paddle crests and the walls of the chambers 20 and 22 is approximately 1 percent of the major diameter of the paddles. For reasons hereinafter described, the clearance between the paddles is greater than the clearance between the paddles and the chamber walls, and depending on the viscosity of the materials being mixed, the ratio of the clearance between the paddles and the clearance between the paddles and the chamber walls varies from a ratio of about 2:1 to about 5:1, with the materials of higher viscosity requiring clearances nearer the top of the range. In one embodiment, for example, employing paddles having a major diameter of 5 inches, a clearance of 0.05 inch was provided between the paddle crests and the walls of the enclosing chambers and a clearance of 0.15 inch was provided between the paddles at their closest approach.

Referring particularly to FIGS. 1 and 2, it will be observed that spiral feed screws 140 and 142 are secured on the portions of the shafts 88 and 90 subjacent the inlet 60 of the barrel 12, in place of the paddles 120 and 122. The spiral feed screws 140 and 142 in transverse cross section have the same configuration as the paddles 120 and 122, described above. The spiral feed screws 140 and 142 are pitched in a direction to advance material from the inlet 60 toward the paddles 120 and 122.

FIGS. 8, 9, 10, 11, 12 and 13 diagrammatically illustrate one mating pair of nonhelical or straight paddles 120S and 122S at successive 30° of rotation, the arrows 144 and 146 indicating their respective direction of rotation. It will be observed that in FIG. 8 position of the paddles, pocket A has its maximum volume while pockets B and C have their minimum volume.

As the paddles rotate from FIG. 8 to FIG. 9 position, pocket A gets progressively smaller, while pocket B gets larger and pocket C remains the same. The material being treated, since it is usually a relatively incompressible material, is consequently extruded through the clearance between the crest of paddle 120S and the flank of its mating paddle 122S, from the pocket A of decreasing volume into pocket B of increasing volume, and since the crest of paddle 120S and the flank of paddle 122S are actually moving in opposite directions to each other, very high shear rates result which in turn results in good mixing of the material.

A small amount of the material may be extruded from pocket A to pocket B through the smaller clearance between the crest of paddle 120S and the wall of the chamber 20. However, for equal clearance the shear and consequent mixing of material is considerably more efficient between the mutually rotating paddles than between the paddle and the stationary wall of the chamber, and for this reason a minimal clearance is provided between the crests of the paddles and the stationary chamber walls so that most of the material is extruded through the clearance between the crest of one paddle and the flank of its mating paddle.

Now, as the paddles rotate from FIG. 9 to FIG. 10 position, and then from FIG. 10 to FIG. 11 position, it will be seen that pocket A decreases in volume, reaching its smallest volume in FIG. 11 position; at the same time pocket B increases in volume to its maximum while pocket C remains unchanged in volume. Thus, in the manner explained above material continues to be extruded from pocket A, which conveniently may be referred to as a compression pocket, to pocket B which conveniently may be referred to as an expansion pocket.

As the paddles rotate from FIG. 11 position successively to FIG. 12 position, FIG. 13 position and to a position similar to FIG. 8 position, it will be seen that pocket B decreases from its maximum volume to its minimum volume, being now a compression pocket; at the same time pocket C increases in volume, being now an expansion pocket, while pocket A remains unchanged in volume. Thus, in the manner explained above material is extruded from compression pocket B to expansion pocket C.

The paddles have now rotated through 180° and a similar sequence of events follows as they are rotated through the next 180°.

The same sequence of events occurs between the paddles 120H and 122H, except that these paddles being formed on a helix as previously pointed out, in addition to subjecting the material to intense kneading and mixing as in the above discussion of flat paddles 120S and 122S, will also impart a forward movement to the material toward the discharge end of the mixer.

In one very efficient arrangement, as shown in FIGS. 2 and 5, following the intermeshing feed screw members 140 and 142 on shafts 88 and 90, are four intermeshing helical paddles 120H and 122H, followed by alternating series of two flat or straight paddles 120S intermeshing with two flat or straight paddles 122S and two helical paddles 120H intermeshing with two helical paddles 122H. All flat or straight paddles are employed when a very high retention time is required and all helical paddles are employed when a very low retention time is required. To suit different requirements of mixing, blending, shearing and retention time the relative number of flat or straight paddles to helical paddles and their arrangement can be suitably varied.

Referring particularly to FIG. 5, the four paddles 120H as well as the four paddles 122H are shown progressively displaced at angles of 45° and in a direction, so that with the paddles rotating in the direction of the arrows, there is some advancing movement imparted to the material as well as mixing thereof. In the above preferred paddle arrangement, the paddles 120H and the paddles 122H of the series of two helical paddles are preferably, as shown, displaced at angles of 45° one with respect to its axially adjacent paddle, while the paddles 120S and 122S of the series of two flat or straight paddles are preferably, as shown, displaced at angles of 90° one with respect to its axially adjacent paddle. Arranged in this manner the series of two helical paddles have a more efficient material advancing action while the series of two straight paddles have a more efficient material mixing action.

Referring to FIG. 6, the helical paddles 120H and 122H are shown with a displacement angle of 30°, in other words the angle between the major axis 148 at the front face of a paddle and the major axis 150 at the rear face of the paddle is 30°. While a displacement angle of 30° is shown as a preferred angle, it may vary between an angle greater than 0° and less than the angular displacement of one paddle with respect to its axially adjacent paddle.

Although only one embodiment of the invention has been illustrated and described, it will be understood that various changes, modifications and substitutions may be incorporated in such embodiment without departing from the spirit of the invention.

I claim:

1. A continuous mixer comprising a casing in the form of parallel intersecting cylinders;
   a material inlet at one end of said casing and a material outlet at the opposite end of said casing;
   a shaft extending axially through each of said cylinders;
   means for rotating said shafts in the same direction and at the same speed;
   a plurality of pairs of adjoining radially interengaging paddles mounted on said shafts for rotation therewith, each paddle on one shaft being disposed 90° out of phase with respect to its interengaging paddle on the other of said shafts;
   said paddles being identical in transverse cross section, having a lenticular configuration with opposed convex flanks joined at the major axis extremities of said paddles by arcuate crests;
   said convex flanks being formed as circular arcs described from points on the extended minor diameter of each paddle offset from the major axis thereof a distance equal to one-half the major diameter of the paddle less the width of the crest,
   the major diameter of said paddles being such as to provide a minimal clearance between the crests of said paddles and their respective cylinder walls;
   and the center distance between said shafts being such as to provide a clearance between the crests of the paddles in one cylinder and the flanks of their interengaging paddles in the other of said cylinders of two to five times the said minimal clearance between the crests of said paddles and their respective cylinder walls.

2. A continuous mixer in accordance with claim 1 wherein the clearance between the crests of the paddles and their cylinder walls is equal to approximately 1 percent of the major diameter of the paddles.

3. A continuous mixer in accordance with claim 1 wherein at least some of said plurality of pairs of adjoining radially interengaging paddles are each formed on a helix and displaced one pair at an angle with respect to an adjoining pair, and wherein each of said helical paddles has a displacement angle less than the angular displacement of one helical paddle with respect to its axially adjacent helical paddle.

* * * * *